United States Patent
Gebhart

(10) Patent No.: US 8,453,815 B2
(45) Date of Patent: Jun. 4, 2013

(54) FRICTION CLUTCH AND DRIVE SYSTEM FOR COOLING AN INTERNAL COMBUSTION ENGINE OF A VEHICLE WITH A FRICTION CLUTCH

(75) Inventor: Manfred Gebhart, Constance (DE)

(73) Assignee: Kendrion Linnig GmbH, Markdorf (DE)

(*) Notice: Subject to any disclaimer, the term of this patent is extended or adjusted under 35 U.S.C. 154(b) by 244 days.

(21) Appl. No.: 12/988,388

(22) PCT Filed: Apr. 9, 2009

(86) PCT No.: PCT/EP2009/002650
§ 371 (c)(1),
(2), (4) Date: Dec. 15, 2010

(87) PCT Pub. No.: WO2009/127363
PCT Pub. Date: Oct. 22, 2009

(65) Prior Publication Data
US 2011/0088639 A1    Apr. 21, 2011

(30) Foreign Application Priority Data

Apr. 18, 2008 (DE) .................. 20 2008 005 470 U

(51) Int. Cl.
*F01P 7/04* (2006.01)
*F01P 7/08* (2006.01)

(52) U.S. Cl.
USPC ....... 192/48.2; 192/48.4; 192/84.31; 310/105

(58) Field of Classification Search
USPC .................................... 192/84.31
See application file for complete search history.

(56) References Cited

U.S. PATENT DOCUMENTS

| 2,666,155 A * | 1/1954 | Kaplan .................. 310/105 |
| 4,926,992 A | 5/1990 | Linnig |
| 5,586,636 A | 12/1996 | Linnig |
| 5,994,810 A | 11/1999 | Davis et al. |
| 6,520,304 B2 | 2/2003 | Bellotti et al. |
| 7,497,310 B2 | 3/2009 | Wolf |
| 2005/0205374 A1 | 9/2005 | Boffelli et al. |

FOREIGN PATENT DOCUMENTS

| DE | 3739537 A1 | 6/1989 |
| DE | 4207710 C2 | 9/1993 |
| DE | 10303183 A1 | 7/2004 |
| DE | 69827237 T2 | 2/2006 |

(Continued)

OTHER PUBLICATIONS

Machine translation of applicant supplied DE 202007001923. May 16, 2007.*

*Primary Examiner* — David D Le
*Assistant Examiner* — Mark Manley
(74) *Attorney, Agent, or Firm* — Bachman & LaPointe, P.C.

(57) ABSTRACT

A friction clutch (5) having a drive side and an output side which can be used to drive a fan impeller (2), and a selectively engageable friction disk clutch (13), which in the engaged state connects the output side to the drive side, and a first eddy current clutch (15) for providing a slip speed on the output side, the first eddy current clutch (15) having an eddy current zone formed on a cooling ring (11), wherein an eddy current zone for a second eddy current clutch (18) is provided on the same cooling ring (11) on which an eddy current zone for the first eddy current clutch (15) is formed.

9 Claims, 4 Drawing Sheets

FOREIGN PATENT DOCUMENTS

Figure 1:
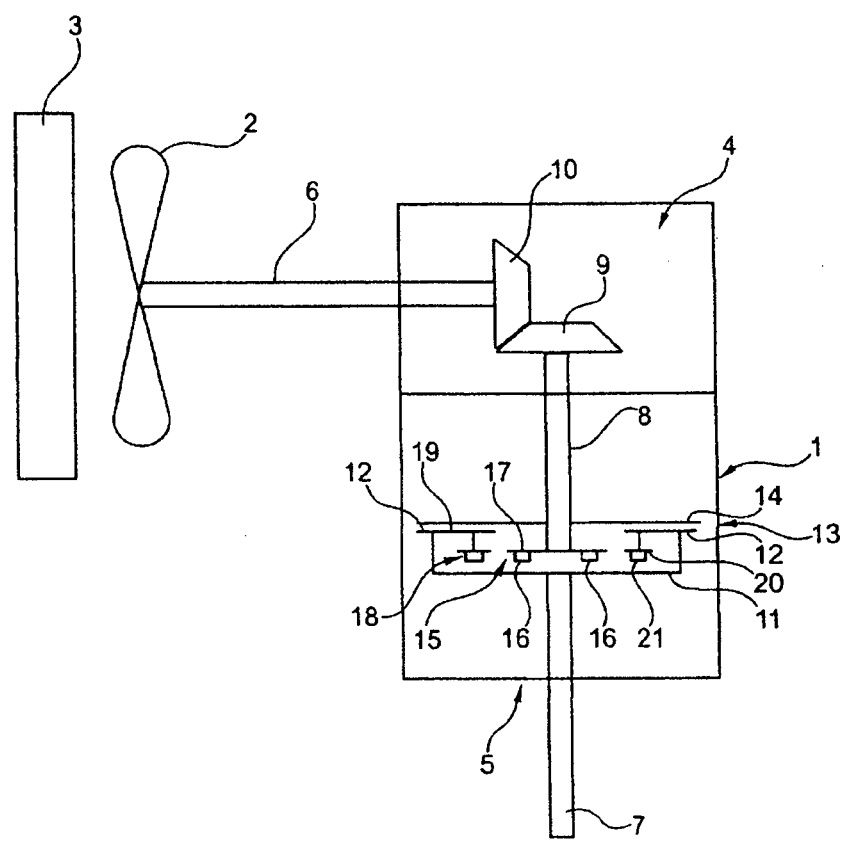

| | | |
|---|---|---|
| DE | 102005014347 | 9/2006 |
| DE | 202007001923 U1 | 4/2007 |
| EP | 0317703 | 6/1988 |
| EP | 0634568 A1 | 1/1995 |
| EP | 1130233 A2 | 9/2001 |
| EP | 1577142 A2 | 9/2005 |
| EP | 1988263 A2 | 11/2008 |
| JP | 7293594 A | 11/1995 |

* cited by examiner

FRICTION CLUTCH AND DRIVE SYSTEM FOR COOLING AN INTERNAL COMBUSTION ENGINE OF A VEHICLE WITH A FRICTION CLUTCH

The invention relates to a friction clutch and to a drive system with such a friction clutch.

STATE OF THE ART

Friction clutches of the type described above are already known in a variety of different forms.

The unexamined German application 4 207 710 A1 discloses an electromagnetically actuated friction clutch, which serves to drive a fan impeller for a cooling fan. The fan impeller is here intended to be driven at the direct speed of the drive unit and with two different slip speeds. A first electromagnetic friction disk clutch is provided to produce the direct speed and a second electromagnetic friction disk clutch is provided in conjunction with a first eddy current clutch to produce a first slip speed. A further eddy current clutch serves to produce a second slip speed.

OBJECT AND ADVANTAGES OF THE INVENTION

The object of the invention is to provide a friction clutch of compact, versatile construction.

This object is achieved by the features of the invention as discussed herein.

Advantageous and appropriate developments of the invention are also specified in the disclosure to follow.

The invention first proceeds from a friction clutch having a drive side and an output side, which can be used to drive a fan impeller. The friction clutch comprises a selectively engageable friction disk clutch, which in the engaged state connects the output side to the drive side. In addition a first eddy current clutch is intended to provide a slip speed on the output side, the first eddy current clutch having an eddy current zone formed on a cooling ring. The slip speed then ensues when the friction disk clutch is not engaged.

The core of the invention resides in the fact that an eddy current zone for a second eddy current clutch is provided on the same cooling ring on which an eddy current zone for the first eddy current clutch is formed.

This allows heat generated by the eddy current clutches to be efficiently dissipated via one component. The cooling ring is an aluminum ring, possibly comprising cooling fins, for example, in which a steel insert, for example, which brings about a desired field conduction of the eddy currents generated in the eddy current zones, is arranged behind the respective eddy current zone.

Opposite the respective eddy current zone there is preferably a rotatable element provided with permanent magnets, for example a carrier ring fitted with permanent magnets, which induces corresponding eddy currents in the eddy current zones.

The friction clutch is preferably designed so that although on the cooling ring there are eddy current zones available for two eddy current clutches, a full functionality is also afforded with only one eddy current clutch operative.

Where the second eddy current clutch is fully embodied with a corresponding permanent magnet carrier, this clutch can preferably be engaged by way of a friction clutch, for example, so that altogether three speeds are possible. In the case of a first slip speed the friction clutch and the second selectively engageable eddy current clutch are disengaged, so that a connection from the drive side to the output side exists only through the first eddy current clutch. A further slip speed, higher than the first slip speed, can be achieved by additionally engaging the second eddy current clutch.

Finally, the drive side is frictionally connected to the output side by engaging the friction disk clutch. A third speed is thus obtained, which with full frictional grip is equal to the drive speed.

The friction disk clutch and/or the second eddy current clutch may be pneumatically or hydraulically operated.

In a particularly preferred development of the invention the friction disk clutch and/or the second eddy current clutch can be electromagnetically engaged and disengaged. For this purpose an armature disk, which may be mounted so that it is axially moveable, for example, may be drawn towards a rotor by an electrically generated magnetic field, of a coil for example, so that a frictional connection is formed between the armature disk and the rotor.

The rotor preferably constitutes an output side of the friction clutch.

In this case the cooling ring preferably forms the drive side of the clutch. Besides the scope for a very compact construction, this has the advantage that cooling of the eddy current clutches is optimized, since the drive side always rotates at drive speed.

By contrast the speed of the output side varies according to the engaged state of the clutch.

The eddy current areas on the cooling ring are preferably arranged overlapping in a radial direction, for example overlapping so that they are radially congruent. A compact construction can thereby be further improved.

Both the second eddy current clutch and the friction disk clutch have a separately moveable armature disk.

It is moreover feasible to provide two separate magnetic field conduction means in the cooling ring. For example a magnetically conductive steel ring is cast into the cooling ring behind radially outwardly overlapping eddy current zones. This contributes to an optimization of the magnetic field, which is induced by the eddy currents.

A friction clutch as described can be used in a drive system for the cooling of an internal combustion engine in a vehicle, for example a motor vehicle, in which a fan impeller and a drive side of the fan impeller are connected by the clutch.

An angular gear mechanism may moreover be provided between the fan impeller, which acts on a radiator of an internal combustion engine, for example, and the clutch. Account can thereby be taken of the spatial arrangements of assemblies in the engine compartment of a motor vehicle, for example.

In the case of a drive system for the cooling of an internal combustion engine of a vehicle, in which a gear mechanism, in particular an angular gear mechanism, and a clutch, for example a clutch as described above, are provided, it is furthermore essential for the invention that the clutch directly abuts the angular gear mechanism on the drive side and is in particular directly affixed thereto (for example, flange-mounted thereon). The connection is preferably such that there are no exposed shaft sections. A robust, compact unit can thereby be achieved, which in hard operational service possesses stability and great resistance to any possible external influences.

DRAWINGS

Several exemplary embodiments of the invention are represented in drawings and are explained in more detail below, indicating further advantages and details.

In the drawings

FIGS. 1-4 each in highly schematic side views show a friction clutch according to the invention with an angular gear mechanism for driving a fan impeller in front of a radiator unit.

DESCRIPTION OF THE EXEMPLARY EMBODIMENTS

FIG. 1 represents a drive system 1 for a fan impeller 2, which is positioned, for example, in front of a radiator 3 of an internal combustion engine (not shown) of a motor vehicle, for example a bus. The drive system 1 comprises an angular gear mechanism 4 and an electromagnetically actuated friction clutch 5. The friction clutch 5 is located directly against the angular gear mechanism 4, for example mounted directly on the angular gear mechanism 4. The angular gear mechanism 4 comprises an output shaft 6, which is connected to the fan impeller 2.

On the drive side the friction clutch 5 comprises a drive shaft 7 and on the output side an output shaft 8, which is led into the angular gear mechanism 4.

Two gearwheels 9, 10 set at an angle to one another are provided in the angular gear mechanism.

The friction clutch comprises a cooling ring 11, which is rotationally fixed to the drive shaft 7. Also rotationally fixed to the cooling ring 11 is an axially moveable armature disk 12 of a friction disk clutch 13. Situated opposite the armature disk 12 is a rotor 14 of the friction disk clutch, which is rotationally fixed to the output shaft 8. The armature disk 12 can be attracted to the rotor 14 by an electromagnet (not shown), thereby allowing a direct connection of the drive shaft 7 to the output shaft 8.

In addition a first eddy current clutch 15 is arranged between the drive shaft 7 and the output shaft 8, a carrier 17 fitted with permanent magnets 16 being rotationally fixed to the output shaft 8. The permanent magnets interact with an opposing eddy current zone on the cooling ring 11, so that a drive torque can be generated.

A speed differential between the drive shaft 7 and the output shaft 8 is necessary for this purpose.

Finally a second eddy current clutch 18, which in contrast to the first eddy current clutch 15 is selectively engageable, however, is provided in the friction clutch 5.

For this purpose the second eddy current clutch 18 has an armature disk 19, which is axially moveable and which under corresponding magnetic forces can be attracted to the rotor 14.

If the friction disk clutch 13 and the second eddy current clutch are disengaged, the drive shaft 7 drives the output shaft 8 at a slip speed by way of the first eddy current clutch 15.

If the second eddy current clutch 18 is additionally activated by attraction of the armature disk 19, the permanent magnets 21 fitted on a carrier 20 can interact with a second eddy current zone formed on the cooling ring 11 in the event of a speed differential between the drive shaft 7 and the output shaft 8, which means that the output shaft 8 is driven at a speed somewhat greater than the slip speed. The second eddy current clutch 18 takes on an additional drive torque, so to speak, which affords a second slip speed.

It is important here that both eddy current zones are provided on the cooling ring 11, which always turns at the speed of the drive shaft 7.

This affords an optimum cooling, which is better at higher speed than at low speed.

In total, therefore, the following speed steps are achievable: slip speed, increased slip speed and direct connection of the drive shaft to the output shaft 8 with the friction disk clutch 13 engaged.

Figure 2:
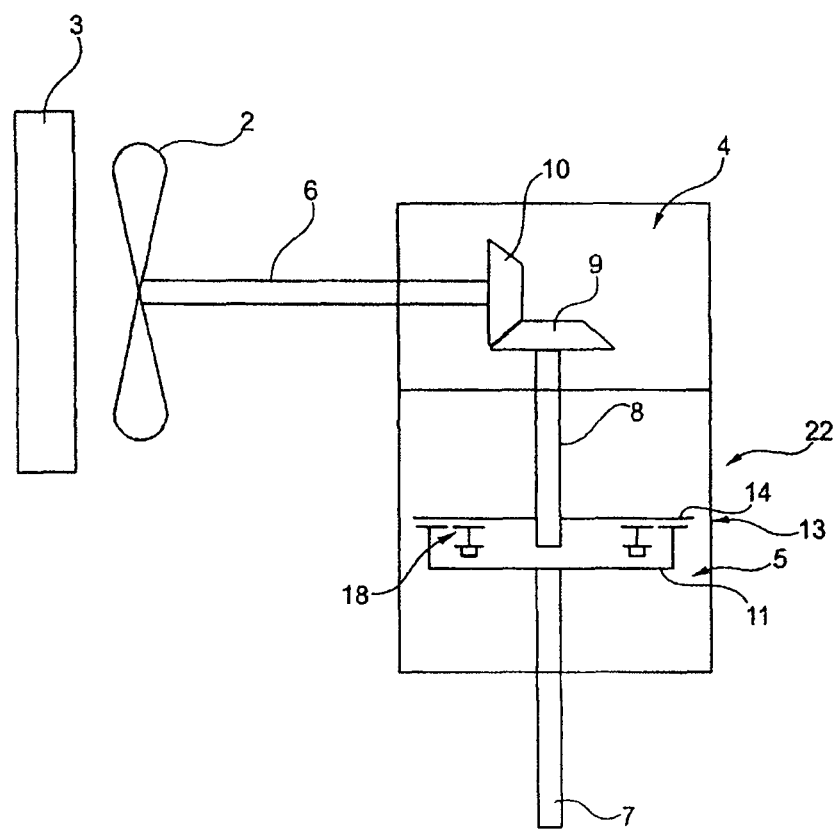

The embodiment of a drive system 22 according to FIG. 2 differs from the embodiment according to FIG. 1 in that the friction clutch comprises only one selectively engageable eddy current clutch 18. A friction disk clutch 13 is provided in just the same way.

This also allows three speeds to be achieved, however. In the case of a first speed the friction disk clutch 13 and also the eddy current clutch 18 are disengaged. However, a speed of the drive shaft 7 is transmitted to the output shaft 8 with a certain, slight slip speed due to the bearing friction, since rotating drive-side parts are supported on the output shaft 8 and a catching effect of the output shaft 8 can occur due to the bearing friction.

A second slip speed is obtained when the selectively engageable eddy current clutch 18 is engaged.

The third speed is the direct connection of the drive shaft 7 to the output shaft 8 via the engaged friction disk clutch 13.

Figure 3:
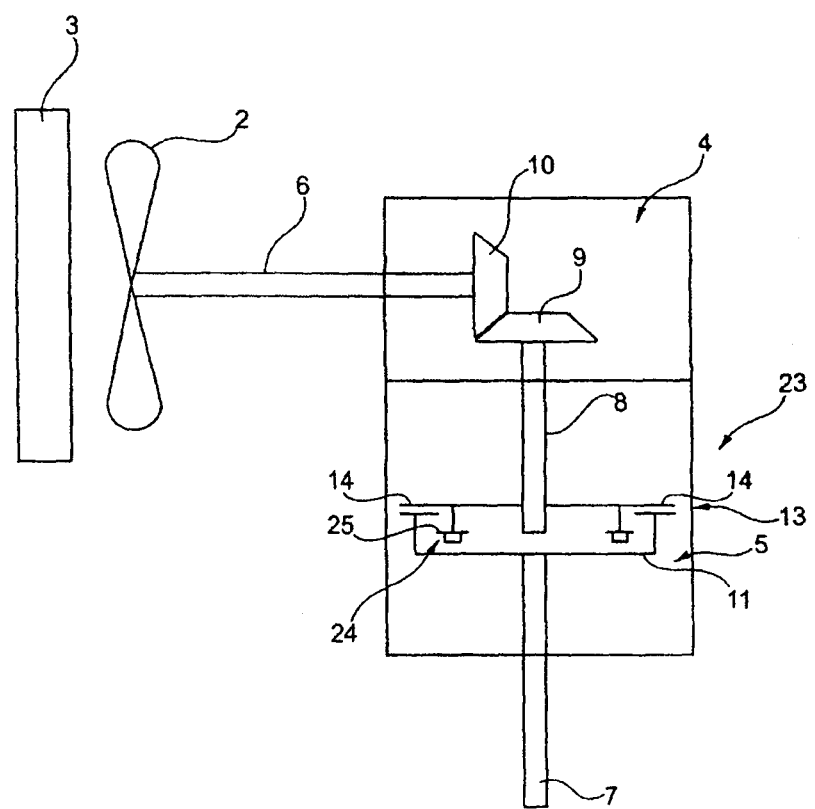

In a further embodiment of a drive system 23 according to FIG. 3 the difference compared to the embodiment according to FIG. 1 is that the friction clutch 5 is two-stage.

As in FIG. 1 it comprises a selectively engageable friction disk clutch 13 with corresponding functionality.

When the friction disk clutch 13 is not engaged, an eddy current clutch 24 is permanently engaged, the permanent magnet carrier 25 of which is connected to the rotor 14. In the event of a speed differential between the drive shaft 7 and the output shaft 8 this results on the drive side in an interaction with the cooling ring 11.

In all three embodiments 1, 22, 23 of a drive system the cooling ring 11 is always arranged on the drive side. Furthermore the eddy current zones are basically formed in this one cooling ring 11.

The design of the embodiment according to FIG. 3 is furthermore such that a selectively engageable, second eddy current clutch 18 could be incorporated by building in additional components.

Various clutch modifications can thereby be achieved using largely the same components, as it were on the modular construction principle.

A further important aspect of the clutches according to FIGS. 1 to 3 is that the friction clutch 5 is directly connected to the angular gear mechanism 4, the friction clutch 5 on the drive side being attached to the angular gear mechanism. There is therefore no exposed shaft section of the drive shaft 8. The clutch 5 is preferably flanged-mounted directly on to the angular gear mechanism 4. This has the advantage of a construction that is not only compact but also particularly stable.

Figure 4:
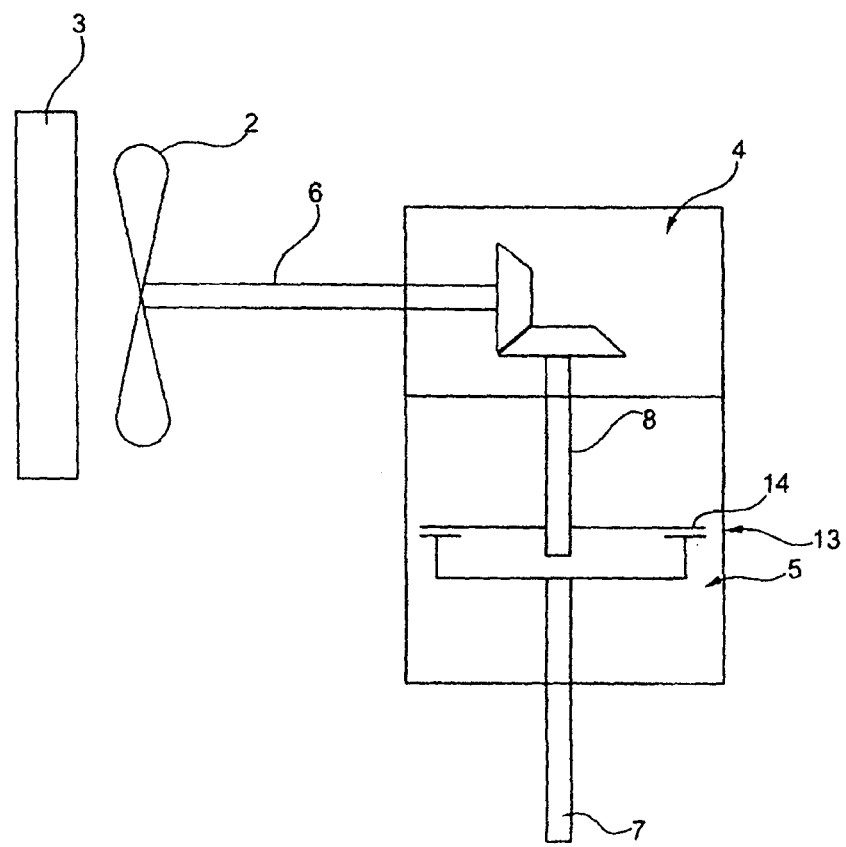

The arrangement of the angular gear mechanism 4 and the friction clutch 5 is also correspondingly configured in FIG. 4.

This embodiment differs from the embodiment according to FIG. 1 in that the friction clutch 5 now only comprises the friction disk clutch 13, so that a speed of the drive shaft 7 can either be connected to the output shaft 8 or disconnected. There is therefore only one speed step.

The invention claimed is:

1. A friction clutch having a drive side, an output side for driving a fan impeller, and a selectively engageable friction disk clutch which in the engaged state connects the output side to the drive side, a first eddy current clutch for providing a slip speed on the output side, the first eddy current clutch having an eddy current zone formed on a cooling ring, wherein an eddy current zone of a second eddy current clutch is on the same cooling ring on which the eddy current zone for the first eddy current clutch is formed.

2. The clutch as claimed in claim 1, further comprising the second eddy current clutch which can be selectively engaged.

3. The clutch as claimed in claim 1, wherein the friction disk clutch and/or the second eddy current clutch can be electromagnetically engaged and disengaged.

4. The clutch according to claim 1, wherein the cooling ring forms the drive side of the clutch.

5. The clutch as claimed in claim 1, wherein a rotor of the friction clutch interacts with an armature disk and forms the output side.

6. The clutch as claimed in claim 1, wherein two separate magnetic field conduction means are provided in the cooling ring.

7. A drive system for cooling an internal combustion engine of a vehicle, comprising a clutch as claimed in claim 1 arranged between a fan impeller and a drive side of the fan impeller.

8. A drive system for the cooling of an internal combustion engine of a vehicle, in which an angular gear mechanism and a clutch as claimed in claim 1 are provided between a fan impeller and a drive side of the fan impeller, the clutch directly abutting the angular gear mechanism on the drive side.

9. The clutch as claimed in claim 1, wherein the eddy current zone of the first eddy current clutch and the eddy current zone of the second eddy current clutch are spaced radially from each other.

* * * * *